UNITED STATES PATENT OFFICE.

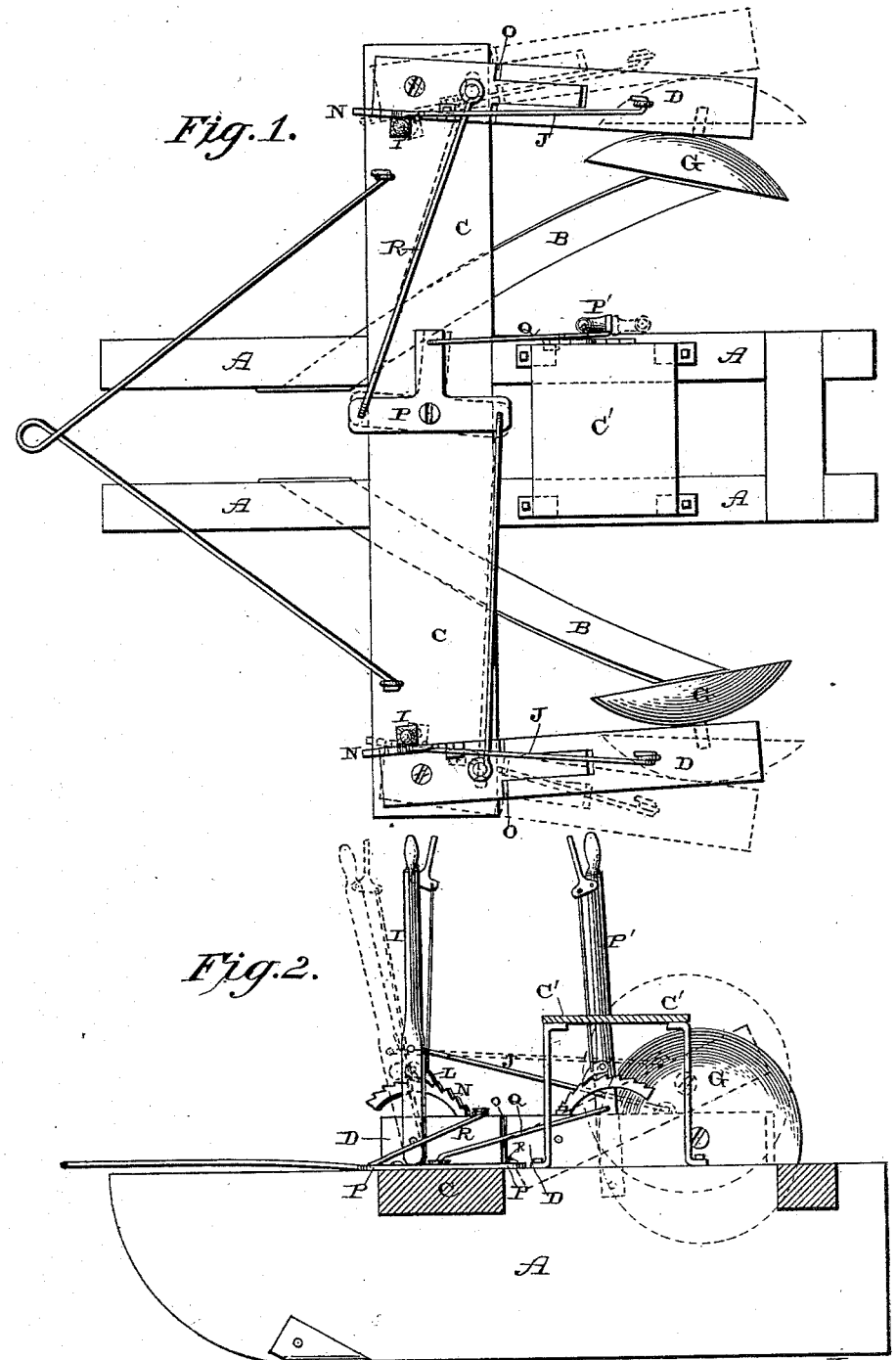

HARLIN B. KING, OF JACKSON, KANSAS.

CULTIVATOR FOR LISTED CORN.

SPECIFICATION forming part of Letters Patent No. 401,177, dated April 9, 1889.

Application filed October 18, 1888. Serial No. 288,511. (No model.)

*To all whom it may concern:*

Be it known that I, HARLIN B. KING, a citizen of the United States, residing in Jackson township, Jewell county, Kansas, have invented certain new and useful Improvements in Corn-Cultivators, of which the following is a description.

My invention relates to an improvement in corn-cultivators; and it consists in the combination of two runners, two rearwardly-inclined knives attached thereto, a supporting-frame placed upon the runners, two disks, pivoted and jointed supports for the disks, levers for adjusting the height of the disks, and levers for moving the disks laterally, as will be more fully described hereinafter.

Figure 1 is a plan view of my cultivator. Fig. 2 is a vertical section of the same.

A represents two runners rigidly secured together at their top edges, and which run upon opposite sides of the rows of growing corn. Secured to the lower edges of the runners, near their front ends, are the rearwardly-inclined knives or cutters B, which cut the weeds and grass between the rows, and which are turned upward at their outer ends, so as not to clog in muddy or heavy soil. Secured upon the tops of the runners, and extending at right angles thereto, is the supporting frame or board C, which is placed in front of the platform C', upon which the driver rides. To the outer ends of the frame C are pivoted the bars D, to which the disks G are journaled at their rear inner edges. These bars D are jointed at O, so as to have both a pivotal motion for adjusting the disks laterally in relation to each other and a vertical motion for regulating the depth to which the disks shall cut.

Pivoted at each end of the board C is a hand-lever, I, provided with a dog, L, to engage with the ratchet N, and to which lever is attached a connecting-rod, J, which is loosely fastened at its rear end to the bar D. By means of the lever the disk can be raised or lowered at will and supported in any desired position by the dog and ratchet. The disks can be lowered and raised and moved laterally, as shown in dotted lines, as may be desired.

At or near the center of the board C is a T-shaped lever, P, which is operated by a connecting-rod, Q, from the hand-lever P', provided with a dog and ratchet, and which is pivoted at its lower end to the side of one of the runners A. Extending from opposite ends of the lever P are the connecting-rods R, which are fastened at their outer ends to bars D, and by means of which the bars carrying the disks G can be adjusted laterally to accommodate them to the width of the rows. Both bars being secured to the same lever, P, they are both operated at the same time.

Having thus described my invention, I claim—

In a corn-cultivator, the combination of the runners, the board or frame placed thereon, the pivoted and jointed bars connected to opposite ends of the board, the disks connected to the bars, levers for operating the bars and disks vertically, levers for moving the bars and disks laterally, and cutters which extend from opposite sides of the runners, substantially as shown.

HARLIN B. KING.

In presence of—
RALPH K. HILL,
A. M. WOODRUFF.